United States Patent

Schade

[11] 3,762,579
[45] Oct. 2, 1973

[54] APPARATUS FOR SETTING DOWN AND STACKING PRODUCTS, MORE PARTICULARLY PANTILES

[76] Inventor: Kurt Schade, Visbeker Str. 31, Wildeshausen, Germany

[22] Filed: July 13, 1971

[21] Appl. No.: 162,295

Related U.S. Application Data

[62] Division of Ser. No. 823,260, May 9, 1969, abandoned.

[52] U.S. Cl. .............................. 214/6 H, 214/6 DK
[51] Int. Cl. ............................................. B65g 57/06
[58] Field of Search ................... 214/6, 6 H, 6 DK, 214/6 P, 6 A, 6 G, 6.5, 6 M, 6 N, 6 C, 6 D, 6 FS

[56] References Cited
UNITED STATES PATENTS

| 1,490,235 | 4/1924 | Smith et al. | 214/6 P |
|---|---|---|---|
| 2,457,233 | 12/1948 | Henshaw | 214/6 D UX |
| 2,698,692 | 1/1955 | Jones et al. | 214/6 D |
| 2,819,805 | 1/1958 | Vieth | 214/6 FS |
| 2,849,236 | 8/1958 | Beaulieu | 214/6 H |
| 2,917,991 | 12/1959 | Segur | 214/6 H |
| 3,013,671 | 12/1961 | Lamb | 214/6 H |
| 3,106,302 | 10/1963 | Mandonas | 214/6 H |
| 3,166,206 | 1/1965 | Porter et al. | 214/6.5 UX |
| 3,390,508 | 7/1968 | Heimlicher | 214/6 DK X |

FOREIGN PATENTS OR APPLICATIONS

| 1,486,909 | 5/1967 | France | 214/6 DK |
|---|---|---|---|
| 1,083,180 | 6/1960 | Germany | 214/6 DK |
| 1,181,654 | 11/1964 | Germany | 214/6 DK |
| 432,352 | 9/1967 | Switzerland | 214/6 H |

Primary Examiner—Robert J. Spar
Attorney—Jacob L. Kollin, Esq.

[57] ABSTRACT

An apparatus for stacking and setting down products, preferably of the brick industry, more particularly pantiles. The pantiles are raised to a predetermined height, stacked progressively and lowered while turning the stack of pantiles about a vertical axis. The stack is removed to a station. The apparatus comprises a device for feeding the pantiles to a turntable rotatable about a vertical axis with vertically sliding support recesses arranged thereon at angular intervals. A discharge device for the pantiles is arranged at the turntable.

4 Claims, 8 Drawing Figures

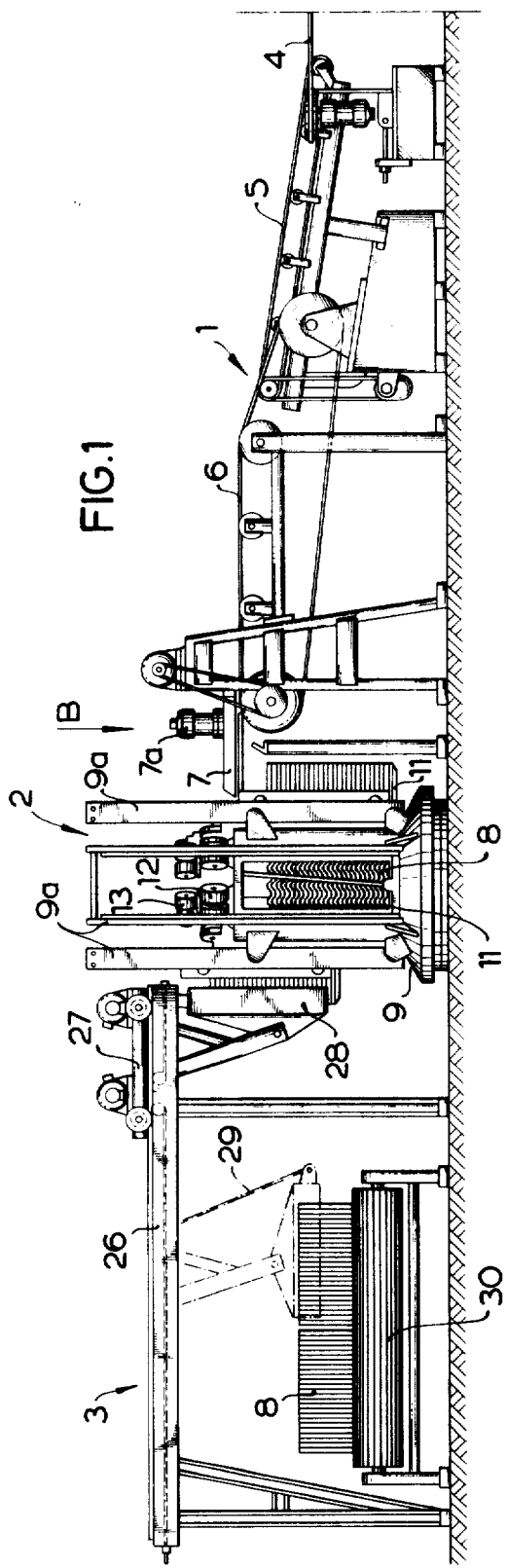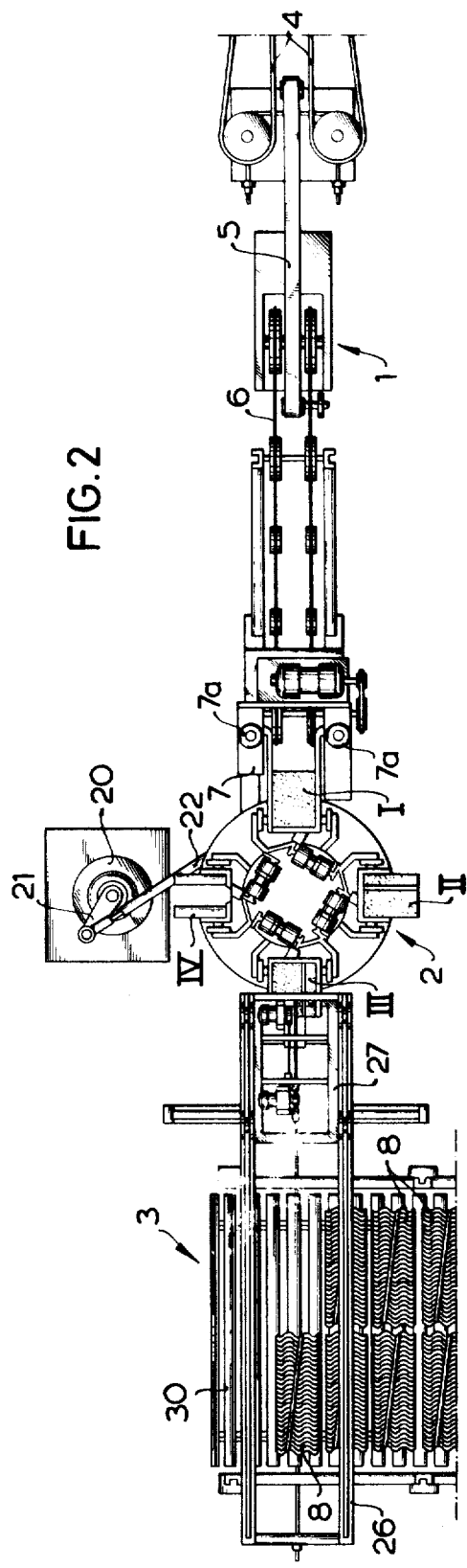

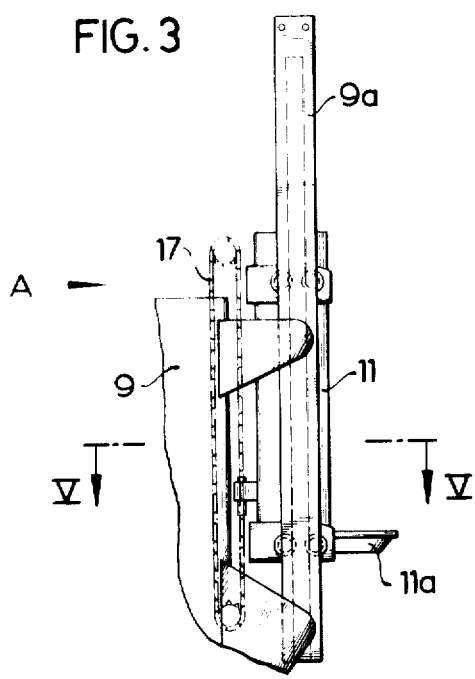
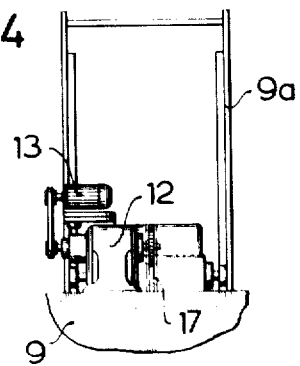
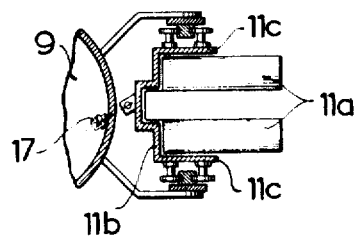
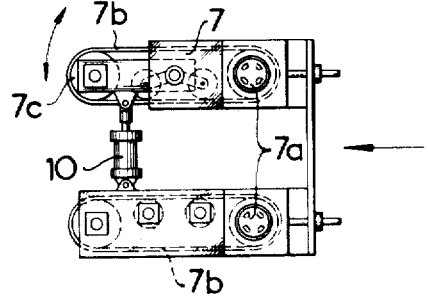
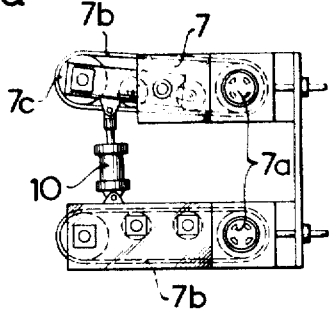
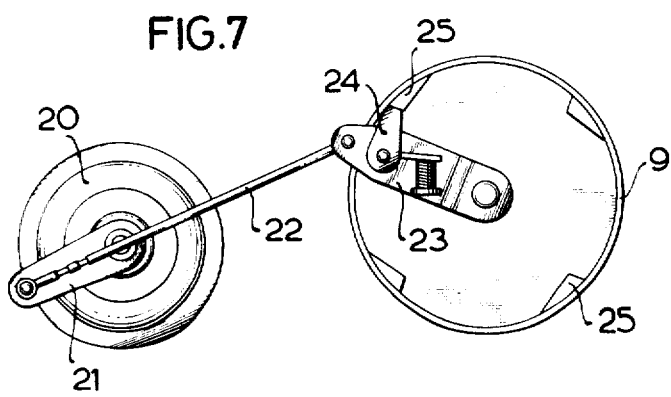

APPARATUS FOR SETTING DOWN AND STACKING PRODUCTS, MORE PARTICULARLY PANTILES

This application is a divisional application of Application Ser. No. 823 260 filed on May 9, 1969, now abandoned.

The invention relates to an apparatus for stacking and setting down products, preferably products of the brick industry, more particularly pantiles.

The underlying aim of the invention is to develope an apparatus of the aforesaid nature which makes possible a high hourly output. At the same time, the apparatus is intended to be sufficiently simple permit structural simplicity, and hence reliability in operation.

This aim is achieved according to the invention in that the pantiles are lifted by a feeder device and fed downwardly into support recesses of a stacking and turning device, whilst the support recesses are progressively lowered, and that the support recesses are turned about the vertical axis to face a discharging device which removes the stack of pantiles by a gripper. The desired high hourly output is achieved by this method substantially in that the pantiles are on the one hand stacked mutually superposed in support recesses, and that, on the other hand, the stacking and turning device which carries the support recesses is rotated step by step about a vertical axis, whilst in every stationery position, simultaneously, a support recess is filled and the content of a filled support recess can be removed by the gripper. The stacking of the pantiles thus occurs in a simple manner utilising the force of gravity by allowing the pantiles to fall into the support recesses as the latter are slowly lowered.

According to a further development of the invention, the pantiles being stacked in the support recesses are hooped with a metal or plastics band or wire before being removed by the gripper and/or before being set down upon the transverse conveyor, whereby firm transportable bundles of pantiles are produced.

According to another further whilst of the invention, a preferred form of stacking and turning device for performing the method is characterised in that it has a turntable about a vertical axis, upon which the vertically sliding support recesses are arranged, preferably at angular intervals of 90°. During operation, the turntable is advanced at intervals through 90° each time, whilst during the stationary phases the support recesses which then occupy the prescribed position are filled, hooped and discharged. In the case of a 90° spacing on the turntable, if four support recesses are arranged, then the advantage is obtained that the work cycle can be varied in the case of three work positions (filling, hooping, discharging), in that, for example, hooping is performed in two positions of the turntable, and the support recesses are discharged only in the fourth position. Another advantage of the 90° spacing of the support recesses lies in that the relatively long feeder device and discharging device need not be mutually aligned in front of and behind the stacking and turning device, but may be brought up to the turntable mutually at right angles. Adaptation to existing restricted space conditions is possible by this means.

The invention will now be described with reference to the accompanying drawings, which illustrate the invention but in no restrictive sense.

FIG. 1 shows a generally schematic side elevation of the apparatus,

FIG. 2 shows a plan of the apparatus according to FIG. 1,

FIG. 3 shows the arrangement of a support recess on the stacking and turning device, FIG. 4 shows the drive device for raising and lowering a support recess, viewed in the direction of the arrow A in FIG. 3, FIG. 5 shows a section taken along the line V-V in FIG. 3, FIG. 6 shows a plan of the vee belt conveyor of the feeder device, viewed in the direction of the arrow B in FIG. 1, FIG. 6a is a plan view of the V-belt conveyor of the feeder device, viewed in the direction of the arrow 13 in FIG. 1, in a shifted position, FIG. 7 shows the drive device for the turntable.

The pantiles which are required to be stacked and discharged are brought up by a feeder ropeway 4 to the apparatus according to the invention, which is composed of a feeder device 1, a stacking and turning device 2 and a discharging device 3. The feeder device 1 has a conveyor belt 5, followed by a rope conveyor 6. The pantiles which are transported by the rope conveyor are finally gripped and moved onwards by a vee belt conveyor 7, which is shown in plan on an enlarged scale in FIG. 6. As this figure shows, the vee belt conveyor has two electric motors 7a arranged laterally with vertical axes, which drive continuous vee belts 7b revolving in a horizontal plane. The vee belts are guided in pulleys for lateral sliding counter to spring power in such manner that they grip the fed pantiles by their longitudinal narrow sides. The one vee belt is passed round a return pulley 7c adapted for lateral swivelling in the horizontal plane, the swivelling bracket arm of which is connected to a compressed air cylinder 10. By the lateral swinging of the return pulley 7c, the gripped pantile is released by the vee belts, and falls downwards.

The stacking and turning device 2 arranged behind the feeder device 1 has a turntable 9, rotatable about a vertical axis, with superstructure to which four lift guides, spaced mutually by 90°, are secured, in each of which a support recess 11 is slidingly guided. The manner of guiding the support recesses on the stacking and turning device, and the construction of a support recess, are clearly shown by the FIGS. 3 to 5. Each support recess 11 is moved up and down in the lift guide 9a by means of a motor with gear and brake. In the exemplary embodiment, a gear 12 is provided for this purpose, upon which the brake motor 13 is placed. A vee belt is used as drive connection between the brake motor and the gear, so that by varying the pulley diameter, the lifting velocity of the support recesses can be varied. The brake motors in the exemplary embodiment are wired on the Dalander principle as reversible-pole motors, whereby a low speed of descent and twice as great a lift speed of the support recesses is obtained. A chain sprocket wheel is keyed onto the driving shaft of the gear, and the support recesses are moved up and down via a chain 17 returned round the rotary element 9 at the bottom.

As is clear from the sectional view in FIG. 5, each support recess 11 has two bottom plates 11a, which are embraced at the rear and laterally as far as half the length, by a guide plate 11b with lateral flanges 11c which are taken up so that a desired number of pantiles can be stacked on the bottom plates.

In order to turn the stacking and turning device 2 about the vertical axis, a crank drive is provided, which in the exemplary embodiment has a gear motor arranged vertically on the ground, which turns a crank 21 to which a thrust rod 22 is articulated as FIG. 7 shows. To the other end of the thrust rod 22 is articulated a rocker arm 23 which is supported coaxially, but freely swivelling, on the underside of the turntable 9. The rocker arm 23 has a spring loaded thrust cam 24, which in the one direction of rotation of the rocker arm strikes drivers 25 secured to the turntable 9, causing the turntable to rotate. In the exemplary embodiment, the crank 21 is constructed so that the crank radius is adjustable.

The discharging device 3 arranged behind the stacking and turning device 2 is order to discharge the support recesses filled with bundles of pantiles, has a horizontal track 26 with a truck 27 transportable thereon. On the truck 27, a gripper 28 is arranged for swiveiling downwardly from the vertical through 90° and vice versa, its swivelling movement being controlled via a chain 29 driven from the truck 27, when the gripper rotates about an eccentric articulation point. The gripper itself substantially comprises two straight lateral walls which are fitted with wear-resistant clamp jaws inflatable with compressed air. The track 26 of the discharging device 3 is arranged to pass a transverse conveyor or rollerway 30 of known construction.

The above described apparatus operates in the following manner: the pantiles 8 which are brought up via the feeder ropeway 4, the conveyor belt 5 and the rope conveyor 6, pass into the vee belt conveyor 7, out of which they fall downwards, when the compressed air cylinder 10 is actuated, into the support recess of the stacking and turning device, which occupies position I (FIG. 2). After the support recess has been filled in position I - i.e. in the exemplary embodiment approximately 30 pantiles have been stacked in — the discharging device rotates through 90° until the filled support recess arrives in Position II. The swivelling movement is effected by means of the crank drive, and one half revolution of the crank 21 rotates the turntable 9 through 90°. By using a crank drive, smooth starting and smooth stopping in the dead points of the movement are achieved. The further half revolution of the crank 21 produces the retraction of the thrust rod 22 with the rocker arm and thrust cam. An additional brake on the lower part of the turntable 9 ensures that the stacking and turning device stops and is locked in the dead point of the crank drive.

In position II, pantiles superposed in the support recesses are automatically hooped by a device, not shown since known per se, in which, for example, a plastics band is passed round the pantiles. For this purpose the support recesses exhibit hinged band guides — for example, for vertical hooping. This automatic hooping may also be performed transversely to the longitudinal axis of the pantiles, in the horizontal or vertical position of the pantile bundle before it is set down upon the transverse conveyor 30. The plastics band which is passed round the bundle of pantiles in then tensioned and sealed in the hopping installation.

During the next rotary movement from position II into position III, the support recess with the hooped bundle of pantiles is automatically raised until the following gripper 28 of the discharging device 3 is able to grip the bundle of pantiles. The gripper then travels laterally over the bundle of pantiles and grips the latter in that the clamp jaws are filled with compressed air. The truck 27 with the charged gripper 28 then travels sideways, causing the gripper to be swivelled through 90° in a horizontal position. The truck travels further as far as above the transverse conveyor 30, namely alternately such a distance that two bundles of pantiles at a time can be set down one behind the other on the transverse conveyors. After two bundles of pantiles have been set down one behind the other, the conveyor belt of the transverse conveyor is moved onwards by one step.

What I claim is:

1. Machine for stacking and setting down stone products, in particular pantiles, comprising a machine frame, inserter means in said machine frame, a turntable rotatable about a vertical axis having a plurality of turntable carrying vertically extending pockets arranged on said turntable at angular intervals and vertically movable supporting plates within each of said pockets, said pockets being open outwardly, means for rotating said turntable in indexing movements, means for lowering said supporting plates relative to said pockets according to the thickness of the pantiles supplied by said inserter and lifting and lowering each of said supporting plates independently of one another, said inserter means having means for laterally gripping and conveying pantiles including a pair of opposed endless V-belts extending in a horizontal plane about pulleys at each respective end, said pulleys being rotatable about vertical axes, one of said pulleys being horizontally swingable to a laterally displaced position to permit the gripped pantiles to drop to the stack being formed below on said supporting plates in one of said pockets, means for horizontally swinging said one pulley, whereby after a stack of pantiles is formed in said one of said pockets, the turntable is indexed to permit formation of a new stack in the next pocket on said turntable.

2. Machine according to claim 1, further comprising a gear brake drive for lifting and lowering each of said supporting plates.

3. Machine as claimed in claim 1, wherein said supporting plates include a pair of bottom plates, said vertically extending pockets includes a pair of guide plates having lateral flanges and embracing said bottom plates laterally half their length, said guide plates forming a vertical channel open outwardly.

4. Machine as claimed in claim 3, further provided with a crank drive in driving connection with said turntable, comprising a thrust rod articulated to a rocker arranged coaxially under the turntable and freely pivotable, said rocker having a thrust cam cooperating with drivers secured to said turntable.

* * * * *